Figure 1:
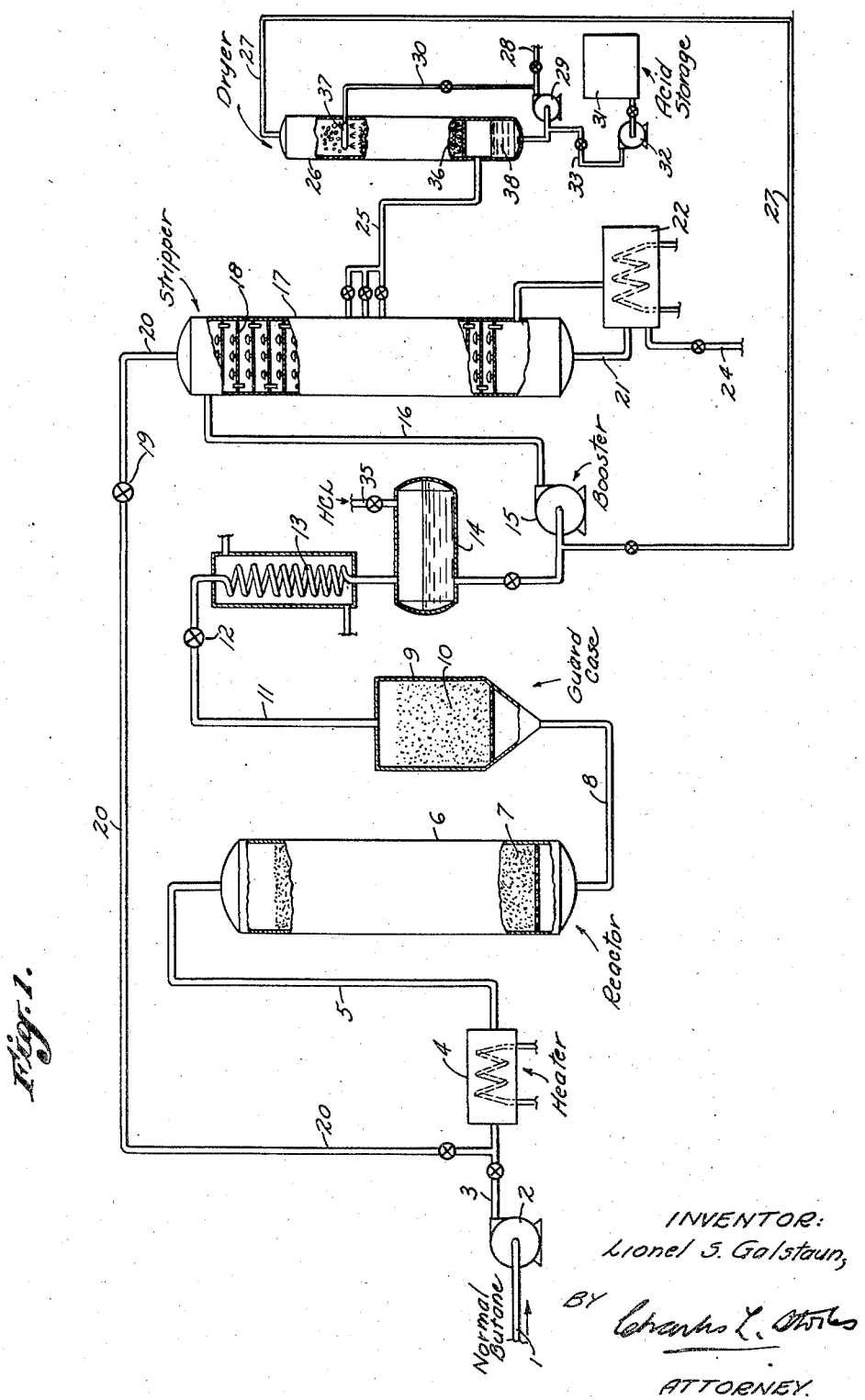

Patented Sept. 10, 1946

2,407,231

UNITED STATES PATENT OFFICE 2,407,231

MOISTURE REMOVAL IN ISOMERIZATION PROCESSES

Lionel S. Galstaun, Oakland, Calif., assignor to Tide Water Associated Oil Company, San Francisco, Calif., a corporation of Delaware Application February 24, 1944, Serial No. 523,699

14 Claims. (Cl. 260—683.5)

This invention relates to catalytic processes wherein hydrocarbons are reacted in the presence of aluminum chloride and hydrogen chloride, and, more specifically, the invention relates to a method of dehydrating mixtures of hydrocarbons and hydrogen chloride produced in such processes whereby the corrosion of equipment is greatly reduced.

In the isomerization of normal butane to isobutane it is customary to use a catalyst of aluminum chloride supported on activated alumina or activated bauxite. Vaporized normal butane together with anhydrous hydrogen chloride is passed over this catalyst. Depending upon the temperature, time of contact with the catalyst, and HCl concentration employed, a portion of the normal butane is converted into isobutane.

Under conditions usually employed, a small portion of the aluminum chloride catalyst is carried from the reaction vessel by the stream of hydrocarbon-HCl vapors. It is desirable to remove this aluminum chloride from the reacted mixture prior to further processing and this is usually accomplished by passing the vapors through a bed of activated alumina or activated bauxite whereby the aluminum chloride is adsorbed on the surface of the alumina or bauxite and the vapors pass on relatively unaffected.

After removal of the traces of aluminum chloride, the vapors, containing HCl and reacted and unreacted hydrocarbons, are condensed to the liquid phase and the liquid is charged to a stripping still wherein the hydrogen chloride is stripped from the hydrocarbons. The stripped hydrogen chloride is recycled to the process and the hydrocarbons are subsequently fractionally distilled to separate the isobutane formed from unreacted normal butane and any side-reaction products.

Due to the extreme corrosiveness of hydrogen chloride in the presence of water every effort is made, in such isomerization processes, to prevent the introduction of moisture. However, in practical operations, minute quantities of water inevitably find their way into the process. A principal source of this unavoidable water is moisture contained in the alumina or bauxite used and/or the formation of water by chemical reaction between HCl and iron oxide impurities in the bauxite. Likewise, moisture and rust in vessels and pipe-lines carrying HCl are a source of water. Even with the most careful operation of an isomerization plant, water finds its way into a commercial isomerization plant in quantity sufficient to cause severe corrosion and may run as high as 100 pounds per day or more. This water accumulates in the column of the stripping still where, in conjunction with the hydrogen chloride present, it causes severe corrosion to the parts of the column resulting in frequent shutdowns for cleaning out the accumulated corrosion products, and for repairs and replacements. Obviously, the use of iron-free and/or moisture-free alumina in the process will decrease the amount of water, resulting in corrosion and frequency of shut-downs; however, as commercial activated bauxite usually contains about 1% of $Fe_2O_3$ and about 1% to 2% of moisture, any effort to obtain purer alumina results in greatly increased cost.

I have discovered that the water entering the stripping still attached to a commercial isomerization plant for the purpose of regenerating and recycling the hydrogen chloride, whether such water is in liquid or vapor form, is in such small percentages that it is practically all dissolved in the hydrocarbons when liquefied.

I have further discovered that a separation of water with consequent corrosion will never occur in such stripping still if a sufficient quantity of liquid hydrocarbons containing such dissolved water be continuously withdrawn from the stripping still as hereinafter more particularly described.

It is an object of the present invention to prevent the separation of water in the stripping column of an isomerization plant. A concomitant object is to reduce the corrosion caused by such water.

Another object is to provide a process whereby moisture may be removed from the hydrocarbon-HCl mixture leaving the activated alumina "guard case" of an isomerization plant without the necessity of subjecting the entire mixture to the action of a drying agent.

A further object is to provide a process whereby hydrocarbons may be isomerized with aluminum chloride as a catalyst in the presence of hydrogen chloride and in which activated alumina containing small amounts of iron oxide and moisture may be used for aluminum chloride removal without the usual corrosion caused by the presence of water.

It is a further object to subject a solution of hydrocarbons, hydrogen chloride, and water to conditions of temperature and pressure whereby the hydrogen chloride is vaporized and removed from the solution while maintaining the concentration of water during the removal sufficiently low so that the water present is held in solution in the hydrocarbon-HCl mixture, whereby separation of an aqueous phase with concomitant corrosion is avoided.

Other objects may be apparent in the following specification.

Briefly, the invention comprises removing a small liquid side stream from a zone in the stripping still at which the dissolved water tends to separate, contacting this stream with a drying agent, and returning the dried stream to the stripping still. The size of the side stream to be removed depends, of course, upon the quantity of water occurring in the plant; however, under normal careful operation of an isomerization plant it need not be above 10% of the volume of total liquid charged to the still per unit of time. Ordinarily from 0.2% to 5% of the total volume has been found effective to practically eliminate corrosion. In a specific operation it was found that a side stream of about 2 to 4 gallons per minute was effective in removing about 100 pounds of water per day and preventing the separation of water in the stripping still with consequent corrosion when the liquid charge to the still was about 70 gallons per minute. Obviously, a greater quantity of material than necessary may be removed as a side stream with the only disadvantages being the necessary additional capacity of the drier and the disturbance of the normal flow of liquid in the stripping still. For these reasons the volume of the side stream should preferably be kept at a low value.

The location of the zone in the stripping still column at which the side stream should be withdrawn has been determined from the corrosion in the still where it was found within a zone in the stripping still column where the temperature is about 100° to 110° F. when operating at the customary pressure of 250 to 300 pounds per square inch gage. This appears to be due to the separation of an aqueous HCl phase which appears to be the immediate cause of the corrosion. Preferably the side stream should be removed from such zone. Such aqueous phase tends to separate, that is at, or immediately above, the point in the column where the temperature is 110° F. As an example, in a specific isomerization plant a stripping still containing 20 bubble trays was used. When operating this still at a bottom temperature of about 225° F. and about 275 pounds gage pressure, separation of an aqueous phase with resulting corrosion appeared on the eleventh, twelfth, and thirteenth trays from the bottom. The temperature on the tenth tray from the bottom normally was about 120° F., while that on the eleventh tray was normally about 90° F. Removal of the side stream from either the eleventh, twelfth, or thirteenth tray gave satisfactory removal of accumulated water.

While the dehydration of the side stream according to the invention is not necessarily dependent upon the use of any specific drying agent, or apparatus, nevertheless there are preferred drying agents which have sufficient power to effectively remove water from combination with HCl. Of those suitable, concentrated sulphuric acid and liquid phosphoric acid are noteworthy. Because of its general abundance and low price, sulphuric acid of about 90% or greater strength is greatly to be preferred. As the sulphuric acid becomes diluted with absorbed water its strength may readily be restored by the addition of sufficient amounts of 98% or fuming sulphuric acid.

Various methods will suggest themselves to the process engineer for contacting the withdrawn side stream with the dehydrating agent, depending somewhat on the dehydrating agent or method used. When sulphuric acid is used the dehydration of the side stream may conveniently be accomplished by passing it upwardly through a tower containing packing material, such as, for example, Raschig rings and simultaneously flowing a stream of sulphuric acid downwardly over the bed. It is preferable to maintain the pressure in the drier not greatly below that in the stripping still to avoid vaporization of the hydrocarbon-HCl mixture in the drier, as any substantial vaporization might result in a carry-over of some sulphuric acid from the drier.

After drying, the side stream is preferably returned to the stripping column to be processed along with the main stream of hydrocarbon-HCl mixture, although, if desired, the side-stream could be passed to a separate stripping still for stripping it of its HCl content. The side stream may be returned to the stripping column at any point in the column above the point of withdrawal or, even, at a point somewhat below the point of withdrawal. A convenient point of return is to the suction side of the pump which charges the stripping still, as this avoids the requirement of a separate pump to circulate the side stream through the drier.

Figure 2:
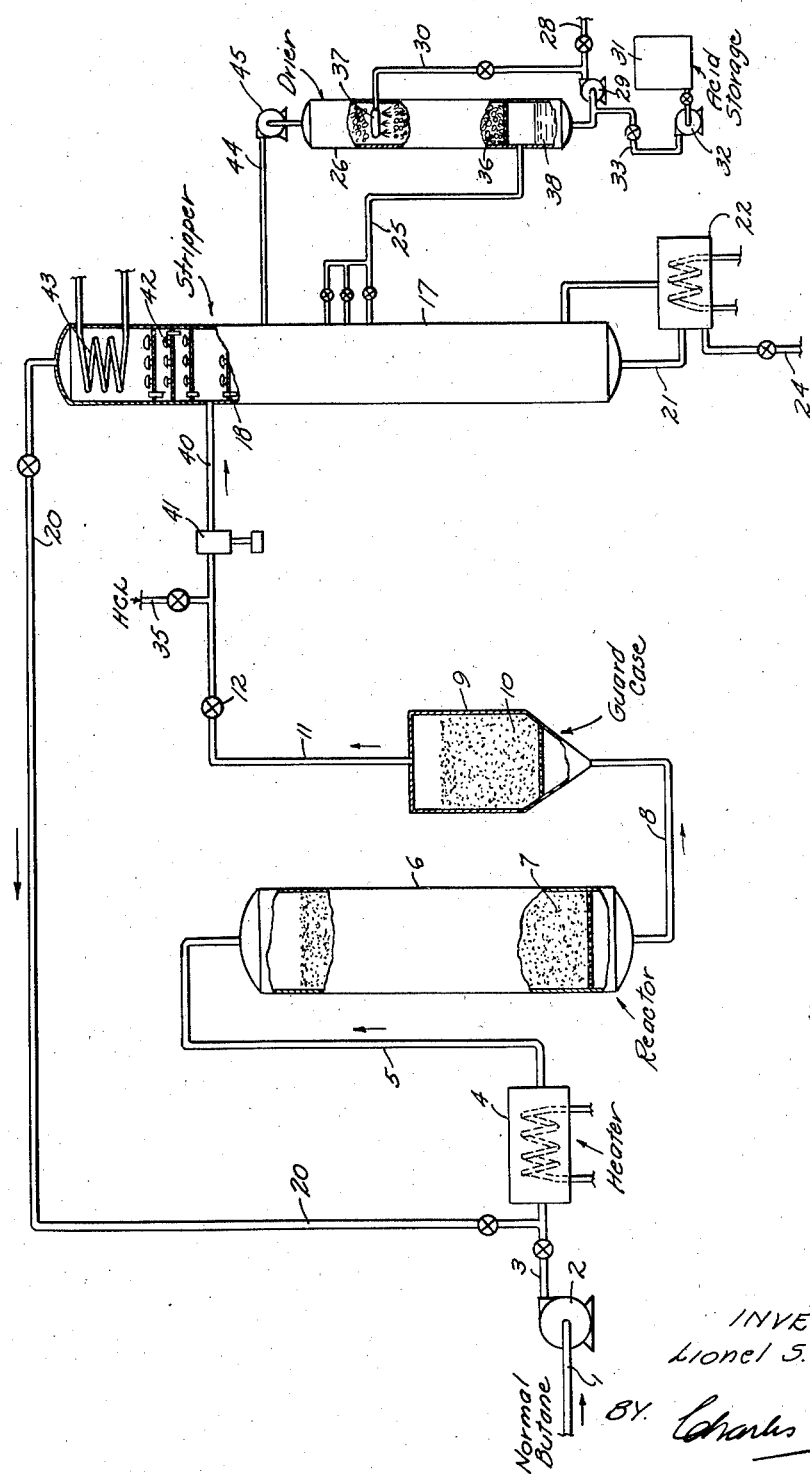
Figure 3:
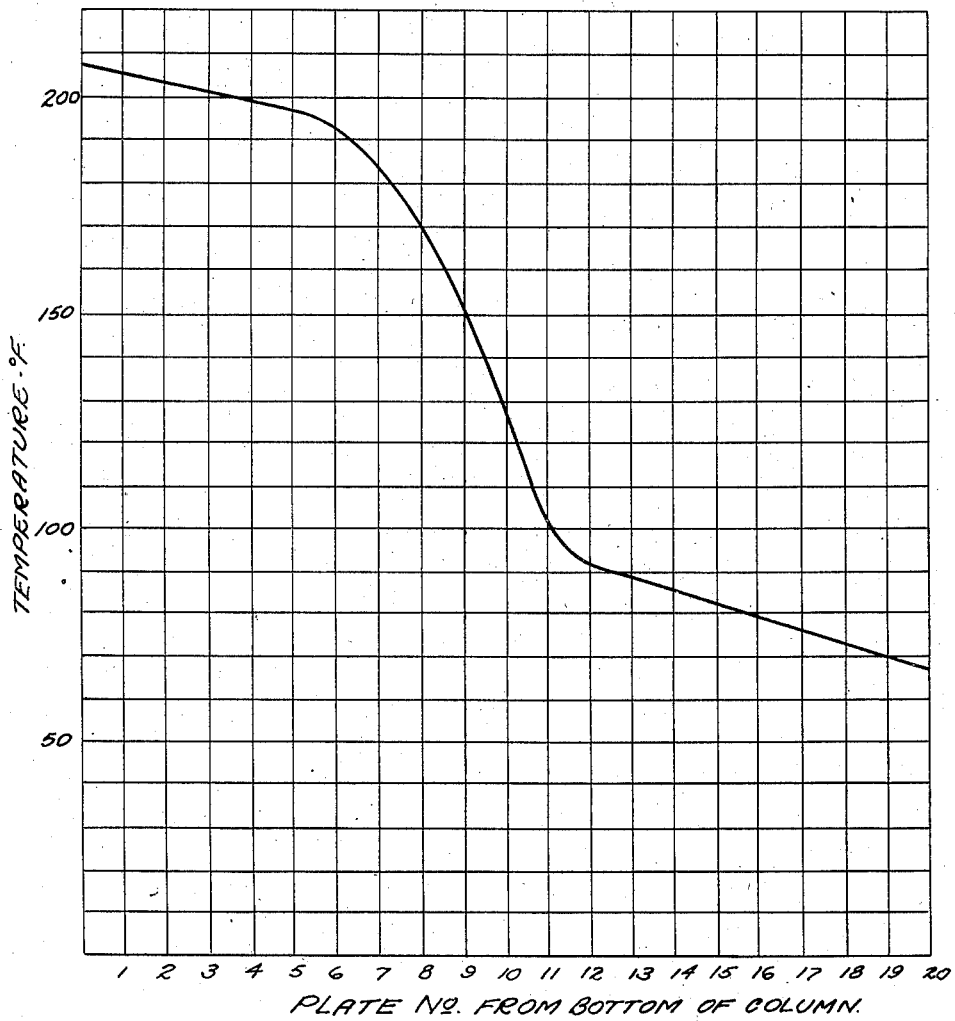

In the drawings Fig. 1 is a diagrammatic sketch showing a typical commercial isomerization plant with my improvements added thereto. Fig. 2 shows an alternative adaptation of my improvements. Fig. 3 is a chart showing typical temperatures on the various plates of a twenty-plate isomerization plant stripping still column when operating at a gage pressure of 275 pounds per square inch and with a molal ratio of hydrocarbons to hydrogen chloride of 9:1 in the charge to the column.

Referring to Fig. 1, normal butane feed in line 1 is charged by pump 2 through line 3 to heater 4 where it is vaporized. Prior to entry into heater 4, hydrogen chloride is introduced from line 20. The vaporized hydrocarbon leaving heater 4, mixed with hydrogen chloride passes through line 5 to reactor 6 which contains aluminum chloride catalyst incorporated on a bed of Activated Alumina 7 and which may be maintained, for an example only, at a temperature of about 200° F. while under a pressure of about 165 to 180 pounds gage. In the presence of the catalyst a percentage of the normal butane is converted to isobutane. The resulting mixture of normal butane, isobutane, and hydrogen chloride, containing traces of aluminum chloride leaves reactor 6 through line 8 and enters guard case 9 wherein it is passed through a bed Activated Alumina 10 to remove the traces of aluminum chloride. From guard case 9 the mixture is passed through line 11 and pressure regulator 12 to condenser 13 wherein the entire mixture, including the hydrogen chloride, is condensed to a liquid which is collected in surge tank 14, while under a pressure a few pounds lower than in the catalyst bed.

Condensed hydrocarbon-HCl mixture, which may contain traces of water picked up in the process, is charged by pump 15 through line 16 to the top of stripping still 17 containing a number of bubble trays 18. As the mixture progresses downwardly in stripper 17 it becomes progressively denuded of HCl which leaves stripper 17 through line 20 controlled by pressure regulating valve 19 and is recycled to line 3 to mix with fresh normal butane charge. Fresh HCl to charge the system and to compensate for leakage and other losses is conveniently added to surge tank 14 through line 35. The hydrocarbon mixture leaves stripper 17 through line 21 and is charged to heater 22 wherein a portion is vaporized and returned to stripper 17 as a heat supply. The remaining hydrocarbon mixture from line 21, now substantially free of HCl, leaves the process through line 24 and is cooled, neutralized, and fractioned to obtain isobutane and other products.

In accordance with the invention, a liquid side stream, amounting to about 10% or less of the feed volume in line 16, is withdrawn through line 25 from a tray in stripper 17 wherein, under ordinary operating conditions, an aqueous phase would otherwise separate. The side stream in line 25 is fed to drier 26 and therein passes upwardly through bed 36 composed of 1-inch Raschig rings or other suitable contact material. Simultaneously concentrated sulphuric acid from line 30 is introduced into drier 26 through distributing spreader 37 and caused to flow downwardly through bed 36 in sufficient volume to wet the contact material, but not sufficient to materially obstruct the upward flow of hydrocarbons. By contact with the descending stream of sulphuric acid the hydrocarbon-HCl mixture is dehydrated after which it leaves drier through line 27 and is returned to the suction side of pump 15.

Conveniently, a layer 38 of sulphuric acid is maintained in the bottom of drier 26. This is circulated through line 30 and spreader 37 by pump 29. The sulphuric acid in the drier is maintained at the desired concentration by withdrawing a small amount of acid through line 28 and injecting a similar amount of 98% or fuming acid from storage tank 31 by means of pump 32 and line 33.

In a specific example a commercial isomerization plant, charging 2500 barrels of normal butane per day together with 70,000 pounds per day of recycled hydrogen chloride, obtained a conversion of 42% of the normal butane to isobutane in 4 parallel tubulated reactors each 50 inches in diameter and 40 feet high and each containing about 7 tons of aluminum chloride-bauxite catalyst (17% aluminum chloride). The reaction mixture, after passage through 2 parallel guard cases each 4.5 feet in diameter and 9 feet high and each containing 3.5 tons of bauxite (analyzing about 2% $Fe_2O_3$ and 1.5% $H_2O$), was stripped in a 20 plate column five feet in diameter and 65 feet high. For several months it was found that heavy corrosion, due to a separated aqueous phase, occurred particularly on the 11th, 12th, and 13th plates from the bottom, requiring a shutdown about every two weeks, or oftener, to clean out these three plates and replace bubble caps.

Installation was then made to withdraw a side stream of 10 to 50 barrels per day from the 10th plate of the stripping column and the heat supplied to the stripping still was somewhat lowered so that the temperature on the 10th plate from the bottom was maintained below 110° F. and that the 9th plate was held above 110° F. This side stream was passed through a tower 18 inches in diameter and 25 feet tall containing 12 feet of 1-inch Raschig rings over which a flow of about 10,000 pounds per day (5 gallons per minute) of 90% sulphuric acid was maintained. The side stream was then returned to join the main stream entering the stripping column. After this installation the plant and stripping column operated seven weeks without necessity for shutdown or any indication of corrosion.

Figure 2 of the drawings illustrates an isomerization plant similar to that shown in Figure 1, but using an alternative arrangement for supplying hydrocarbon-HCl mixture to the stripping still. In this case hot hydrocarbon-HCl vapors from guard-case 9 are passed directly to stripping still 17 through lines 11 and 40. A compressor 41 may be used, if needed, to supply the desired pressure in still 17. Stripping still 17 is supplied with condenser 43 to furnish liquid reflux to the column. If desired several additional plates 42 may be placed in the column above the point of entry of the vapors. Vapors entering through line 40 pass upwardly in the column to condenser 43 whereby the greater portion of the hydrocarbons are condensed together with some HCl and returned to the column to pass downwardly therethrough. Hydrogen chloride, and any uncondensed hydrocarbons, are recycled to the process through line 20. The ratio of water vapor to hydrocarbon vapors is such that there is sufficient liquid hydrocarbon to dissolve substantially all the water. Otherwise the operation of stripper 17 is the same as in the operation illustrated by Figure 1; and, as there illustrated, a side-stream is removed through line 25 and dried in drier 26. The dried stream is returned to still 17 through line 44 by means of circulating pump 45. As explained with respect to Figure 1, fresh HCl, as needed, may be added through line 35.

Figure 3 of the drawings is a chart showing typical temperatures on the various plates of a twenty-plate isomerization plant stripping column when operating at a gage pressure of 275 pounds per square inch and with a molal ratio of hydrocarbons to hydrogen chloride of 9:1 in the charge to the column. It will be noted that between the 6th and the 11th plates from the bottom the temperature drops rapidly from plate to plate, whereas, above the 11th plate the temperature gradient is only slight. Under these conditions the 11th plate is the most advantageous point for withdrawal of the side-stream. Under other operating conditions, particularly at other pressures, the temperatures may vary somewhat from those shown in Figure 3; however, the temperature gradient curve of the tower will usually have the characteristic break shown, and it will generally be found that the concentration of water is greatest at this break point. Obviously, under substantially lower pressures in the tower the break point will be at a lower temperature and, conversely, under high pressures the break point will be at a higher temperature.

While in the above disclosure reference was largely made to butane isomerization plants, the invention is not limited thereto, but may be used equally well and in an analogous manner in connection with plants isomerizing pentane and heavier hydrocarbons and where a mixture of hydrocarbons and hydrogen chloride, contaminated with a small amount of water, is distilled to separate the hydrogen chloride. The essential feature is to operate the still so that the water tends to accumulate at a definite point and then to withdraw the side stream at that point. The invention is likewise applicable to the prevention of corrosion in apparatus susceptible of use, for instance in dechlorinating hydrocarbons wherein similar conditions exist.

It is to be understood that, in various isomerization processes, the method of contact of the hydrocarbon with the catalyst and other details of operation may vary from the above description of a typical butane isomerization process.

However, the invention is applicable to any such process wherein, as a step of the process, hydrogen chloride is separated by distillation from a mixture of hydrogen chloride and hydrocarbons containing a minor amount of water.

It must be understood that the scope of the invention is not limited, or bound, to any theory herein set forth. Such theories as are herein expressed, however, are believed to be a correct explanation of the physics of the process as provided by reasonable deductions from data in an operating plant, while minor details may be explained in further ways, unnecessary to exemplify in view of the known operating results.

The zone from which the side stream is withdrawn is within that range of temperature and pressures given in the illustrations believed to be best, but which may be varied to give similar results in degree. For instance, a variation to permit a limited separation of water in the specified zone, while undesirable as permitting a slight degree of corrosion, nevertheless gives greatly extended operation of the column due to the fact that such limited amount of separated water is immediately withdrawn after separation in the side stream together with the water in solution in the oil.

I claim as my invention:

1. A process of preventing corrosion which comprises: introducing a stream of liquid hydrocarbons containing dissolved hydrogen chloride and dissolved water into a corrodible stripper to flow downwardly therethrough under coordinated conditions of temperature and pressure sufficient to separate hydrogen chloride, withdrawing a portion of said stream from a zone intermediate the ends of said stripper in which said water tends to separate in liquid form when unregulated, and regulating said temperature and pressure conditions to effect removal of water in said portion while in solution in said hydrocarbons.

2. In a process wherein a liquid stream consisting essentially of hydrocarbons and hydrogen chloride and containing a small amount of dissolved water is introduced into a fractionating column to flow downwardly and therein hydrogen chloride is stripped from the hydrocarbons under conditions of temperature and pressure which cause the water to be retained in the column, the method of maintaining a concentration of water in the column below a degree of substantial separation which comprises: withdrawing a minor side-stream of liquid down-flux from a zone in the fractionating column in which there is a concentration of water greater than the concentration of water in the entering stream.

3. The method of claim 2 in which the side stream is withdrawn from a zone in the fractionating column where the temperature is of the order of 110° F., while under a pressure of the order of 275 pounds.

4. The method of claim 2 in which the side-stream is withdrawn from a zone in the fractionating column in which the concentration of water is substantially the greatest but below the degree of substantial separation in liquid form.

5. The method of claim 2 in which the volume of the side-stream is between about 0.2% and about 5.0% of the volume of the main stream entering the fractionating column.

6. The method of claim 2 in which the volume of the side-stream is less than 10% of the volume of the main stream entering the fractionating column but sufficiently large to maintain in solution, without separation of an aqueous phase, a quantity of water equal to that entering the fractionating column.

7. In a process wherein a liquid stream consisting essentially of hydrocarbons and hydrogen chloride and containing a small amount of dissolved water is introduced into a fractionating column to flow downwardly and therein hydrogen chloride is stripped from the hydrocarbons under conditions of temperature and pressure which cause the water to be retained in the column, the method of maintaining a concentration of water in the column below a degree of substantial separation which comprises: withdrawing a minor side-stream of liquid down-flux from a zone in the fractionating column in which there is a concentration of water greater than the concentration of water in the entering stream, removing water from the withdrawn side-stream, and then returning the side-stream to the fractionating column.

8. The method of claim 7 in which water is removed from the side-stream by contacting said side-stream with a dehydrating agent of sufficient dehydrating potential to remove water from hydrogen chloride.

9. The method of claim 7 in which the water is removed from the side-stream by contacting said side-stream with sulphuric acid of a concentration not substantially less than 90%.

10. The process according to claim 7 in which the side-stream after removal of water therefrom is returned to the fractionating column in admixture with the main stream.

11. In a process wherein a liquid stream consisting essentially of hydrocarbons and hydrogen chloride and containing a small amount of dissolved water is introduced into a fractionating column and therein hydrogen chloride is stripped from the hydrocarbons under conditions of temperature and pressure which cause the water to be retained in the column and wherein it is desired to prevent excessive concentration of water, the step which comprises: withdrawing a minor side-stream of liquid down-flux from a zone in said fractionating column in which there is a substantially increased concentration of water.

12. The method of removing water from a mixture of hydrocarbons and hydrogen chloride undergoing fractionation for the purpose of separating the hydrogen chloride from the hydrocarbons, which comprises: charging a liquid stream of hydrocarbons and hydrogen chloride containing a small amount of dissolved water into a stripping column equipped with a series of bubble trays, flowing said stream downwardly over said bubble trays in contact with ascending vapors under conditions of temperature and pressure sufficient to vaporize hydrogen chloride while maintaining the major portion of the hydrocarbons in the liquid phase, supplying heat at the bottom of said column to produce said ascending vapors and to maintain said temperature, withdrawing a stream of hydrogen chloride vapors from the top of said column, withdrawing a stream of hydrocarbons from the bottom of said column, withdrawing a minor stream of liquid down-flux from a bubble tray of the column intermediate the top and bottom of the column, dehydrating said side-stream, returning the dried side-stream to said column for further stripping in conjunction with the first mentioned stream, and controlling the heat supplied to the bottom of the tower so that said water will concentrate in the down-flux contained on said intermediate tray.

13. The method of removing water from a mixture of hydrocarbons and hydrogen chloride undergoing fractionation for the purpose of separating the hydrogen chloride from the hydrocarbons, which comprises: charging a liquid stream of normal butane, isobutane, and hydrogen chloride containing a small amount of dissolved water into a stripping column equipped with a series of bubble trays, flowing said stream downwardly over said bubble trays in contact with ascending vapors at a pressure between 200 and 300 pounds gage and under conditions of temperature sufficient to vaporize hydrogen chloride while maintaining the major portion of the hydrocarbons in the liquid phase, supplying heat at the bottom of said column to produce said ascending vapors and to maintain said temperature, withdrawing a stream of hydrogen chloride vapors from the top of said column, withdrawing a stream of normal butane and isobutane from the bottom of said column, withdrawing a minor stream of liquid down-flux from a bubble tray of the column intermediate the top and bottom of the column, contacting said side-stream with a chemical drying agent sufficient to remove water therefrom, returning the dried side-stream to said column for further stripping in conjunction with the first mentioned stream, and controlling the heat supplied to the bottom of the tower so that the temperature of the liquid on said intermediate tray will be below about 110° F. and the temperature of the liquid on the tray next below said intermediate tray will be above about 110° F.

14. In an isomerizing process wherein a stream of hydrocarbons and hydrogen chloride is contacted with aluminum chloride and with activated aluminum oxide and the contacted stream is stripped of hydrogen chloride which is recycled to the process and wherein the stream becomes contaminated with small amounts of dissolved water, the combination of steps comprising: stripping hydrogen chloride from admixture with hydrocarbons in a stripping column under conditions of temperature and pressure that the contaminating water concentrates in a zone of said column intermediate the top and bottom thereof, removing from said column a small portion of the liquid down-flux from said zone, contacting said portion with a chemical drying agent, and then subjecting said portion to further stripping to remove its contained hydrogen chloride.

LIONEL S. GALSTAUN.